(12) United States Patent
Sun

(10) Patent No.: US 8,757,581 B2
(45) Date of Patent: Jun. 24, 2014

(54) FIXING DEVICE FOR FAN

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 82 days.

(21) Appl. No.: 13/427,925

(22) Filed: Mar. 23, 2012

(65) Prior Publication Data

US 2013/0221186 A1   Aug. 29, 2013

(30) Foreign Application Priority Data

Feb. 27, 2012   (CN) .......................... 2012 1 0045272

(51) Int. Cl.
*H05K 7/20*   (2006.01)

(52) U.S. Cl.
USPC ... 248/639; 248/674; 248/224.8; 248/225.21; 415/213.1; 454/184; 361/695

(58) Field of Classification Search
USPC ............. 248/639, 27.1, 213.1, 231.81, 316.7, 248/674, 675, 636, 228, 680, 216.1, 217.3, 248/220.21, 221.11, 222.14, 224.8, 225.11, 248/225.21; 415/182.1, 178, 220, 213.1; 361/679.46, 695, 697; 454/184
See application file for complete search history.

(56) References Cited

U.S. PATENT DOCUMENTS

| 3,697,034 | A  | * | 10/1972 | Shell ............................. 248/243 |
| 5,677,829 | A  | * | 10/1997 | Clemens ....................... 361/697 |
| 5,788,566 | A  | * | 8/1998  | McAnally et al. ............ 454/184 |
| 6,017,185 | A  | * | 1/2000  | Kuo .............................. 415/177 |
| 6,392,885 | B1 | * | 5/2002  | Lee et al. ...................... 361/697 |
| 6,485,260 | B2 | * | 11/2002 | Orlowski et al. .......... 415/213.1 |
| 8,422,226 | B2 | * | 4/2013  | Ye et al. ....................... 361/695 |
| 2011/0091313 | A1 | * | 4/2011 | Li .................................. 415/119 |
| 2013/0149138 | A1 | * | 6/2013 | Sun ............................. 415/213.1 |

* cited by examiner

*Primary Examiner* — Anita M King
(74) *Attorney, Agent, or Firm* — Novak Druce Connolly Bove + Quigg LLP

(57) ABSTRACT

A fixing device for fixing a fan includes a fixing plate and a pair of fastening members. The fan includes a sidewall defining a number of fixing holes. The fixing plate defines a vent area and a number of slots located around the vent area. Each fastening member includes a connecting plate, a number of first hooks extending out from a first side of the connecting plate, and a number of second hooks extending out from a second side of the connecting plate opposite to the first hooks. Each first hook is latched into the corresponding slot of the fixing plate, each second hook is latched into the corresponding fixing hole of the fan.

10 Claims, 5 Drawing Sheets

FIXING DEVICE FOR FAN

CROSS-REFERENCE OF RELATED APPLICATIONS

Relevant subject matter is disclosed in two pending U.S. patent applications, both titled "FIXING DEVICE FOR FAN", with the application Ser. Nos. 13/403,926 and 13/426,632, respectively, filed on Feb. 23, 2012, and Mar. 22, 2012, which are assigned to the same assignee as this patent application.

BACKGROUND

1. Technical Field

The present disclosure relates to fixing devices, and particularly to a fixing device for a fan such as a fan used in a computer system.

2. Description of Related Art

In a typical computer system, one or more fans are secured by screws or the like to an enclosure of the computer system. The fans are used for producing airflow to dissipate heat from electrical components within the enclosure, thus keeping the components operating within a desired temperature range. However, as computer systems become smaller in size, the components are more tightly arranged within the enclosure of the computer system. When the fans are secured to or removed from the enclosure, use of a screwdriver for screwing or unscrewing the screws may cause damage to the components, as there is not enough space for the screwdriver within the enclosure of the computer system. In addition, the installation or removal of the screws is time consuming and troublesome.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references can mean "at least one."

Figure 1:
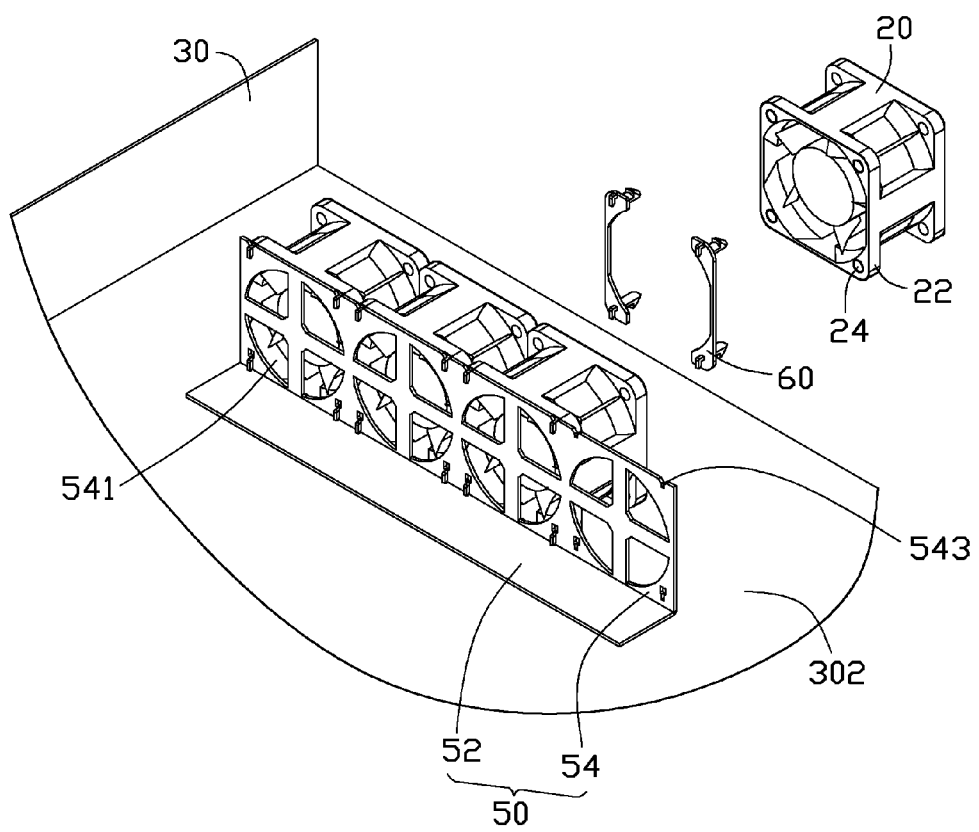
FIG. 1 is an exploded, isometric view of part of an electronic device which employs an exemplary embodiment of a fixing device, wherein the fixing device includes an L-shaped support and a plurality of fastening members.
Figure 2:
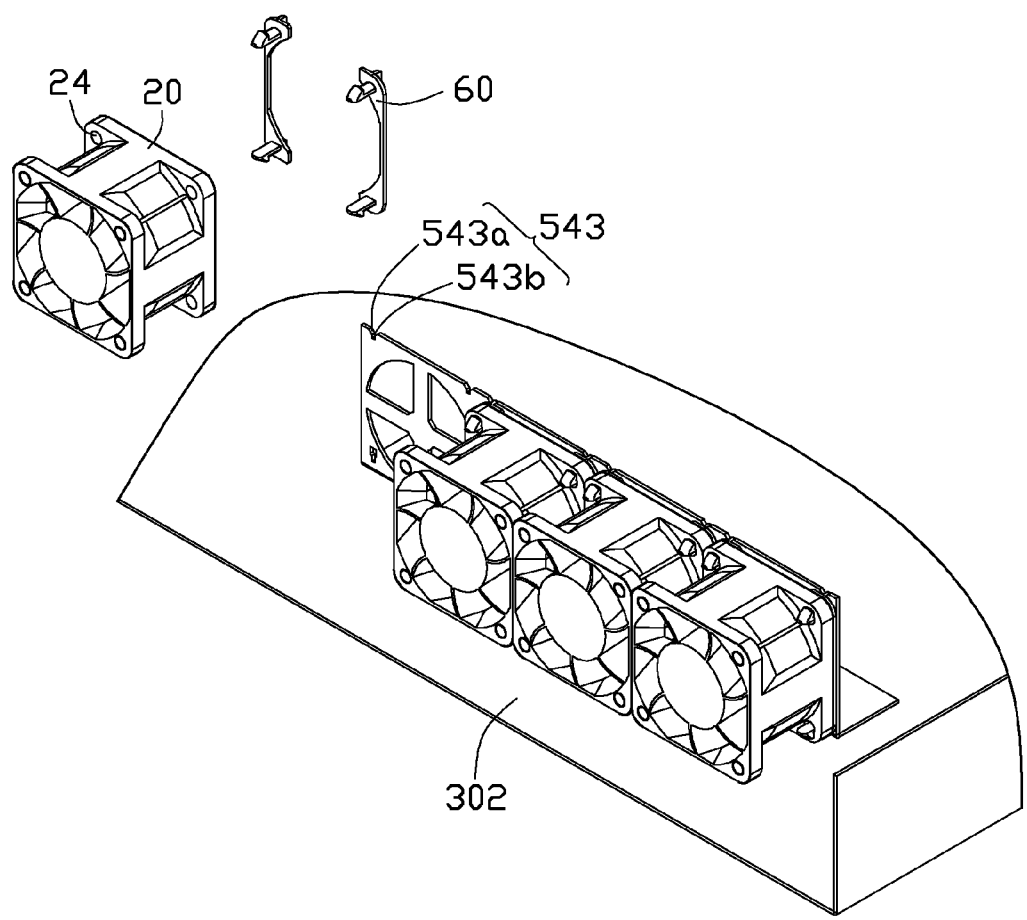
FIG. 2 is similar to FIG. 2, but viewed from another perspective.

Referring to FIGS. 1 and 2, aspects of an exemplary embodiment of a fixing device are shown. The fixing device is used for fixing one or more fans 20 in an electronic device 30. Each fan 20 includes two opposite sidewalls 22. Four corners of each sidewall 22 define four fixing holes 24. The electronic device 30 includes a bottom wall 302. The fixing device includes an L-shaped support 50 and a plurality of fastening members 60.

The support 50 includes a mounting plate 52 secured to the bottom wall 302, and a fixing plate 54 perpendicularly extending up from the mounting plate 52. A plurality of vent areas 541 is defined in the fixing plate 54, with the vent areas 541 aligned along the lengthwise direction of the fixing plate 54. Each vent area 541 includes a plurality of through holes. The fixing plate 54 defines a plurality of slots 543, each slot 543 being adjacent to a respective corner of a respective vent area 541. Each slot 543 at each top corner of each of the vent areas 541 includes a guiding portion 543a extending through the top edge of the fixing plate 54, and a holding portion 543b extending down from a bottom end of the guiding portion 543a. Each slot 543 at each bottom corner of each of the vent areas 541 is similar to each slot 543 at each top corner of each of the vent areas 541, and includes a guiding portion 543a communicating with a corresponding one of the through holes of the vent area 541, and a holding portion 543b extending down from a bottom end of the guiding portion 543a. A width of each guiding portion 543a is larger than a width of the corresponding holding portion 543b.

Figure 3:
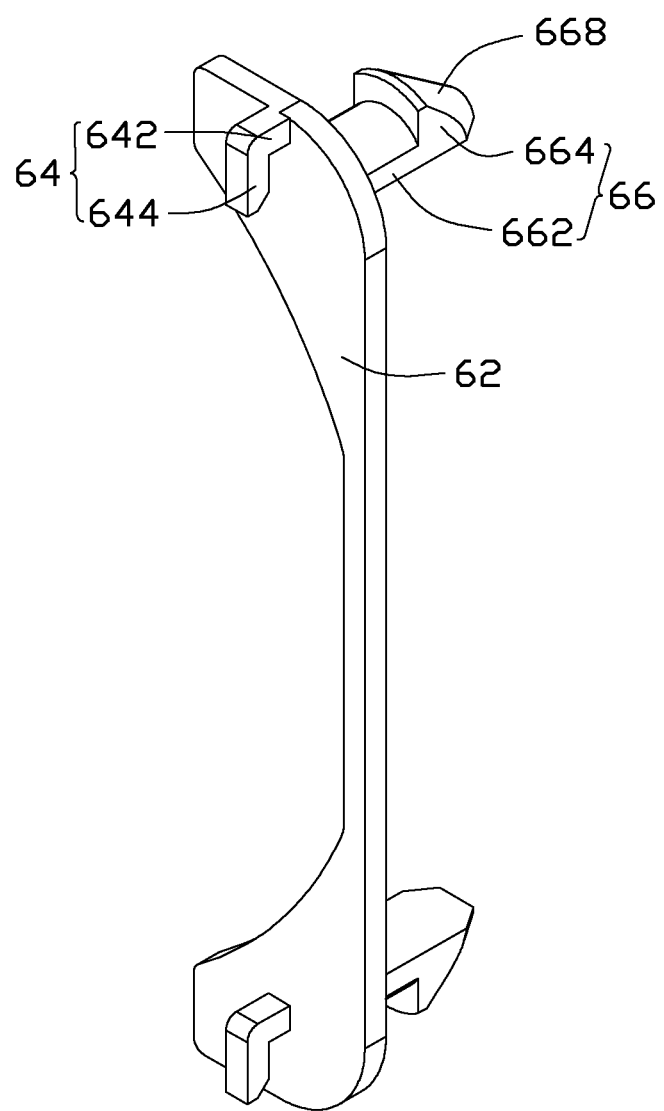
FIG. 3 is an enlarged view of one of the fixing members of FIG. 1.

Referring to FIG. 3, each fastening member 60 includes a substantially C-shaped connecting plate 62, two first hooks 64 extending out from two opposite ends of a first side of the connecting plate 62, and two second hooks 66 extending out from two opposite ends of a second side of the connecting plate 62 opposite to the first hooks 64. Each first hook 64 includes an engaging block 642 substantially perpendicularly extending out from the connecting plate 62, and a latching block 644 substantially perpendicularly extending down from a distal end of the engaging block 642. Each second hook 66 includes a resilient extending portion 662 substantially perpendicularly extending out from the connecting plate 62, and a stop portion 664 extending out from a distal end of the extending portion 662. A side surface of each stop portion 664 away from the other stop portion 664 defines a tapered guiding surface 668.

Figure 4:
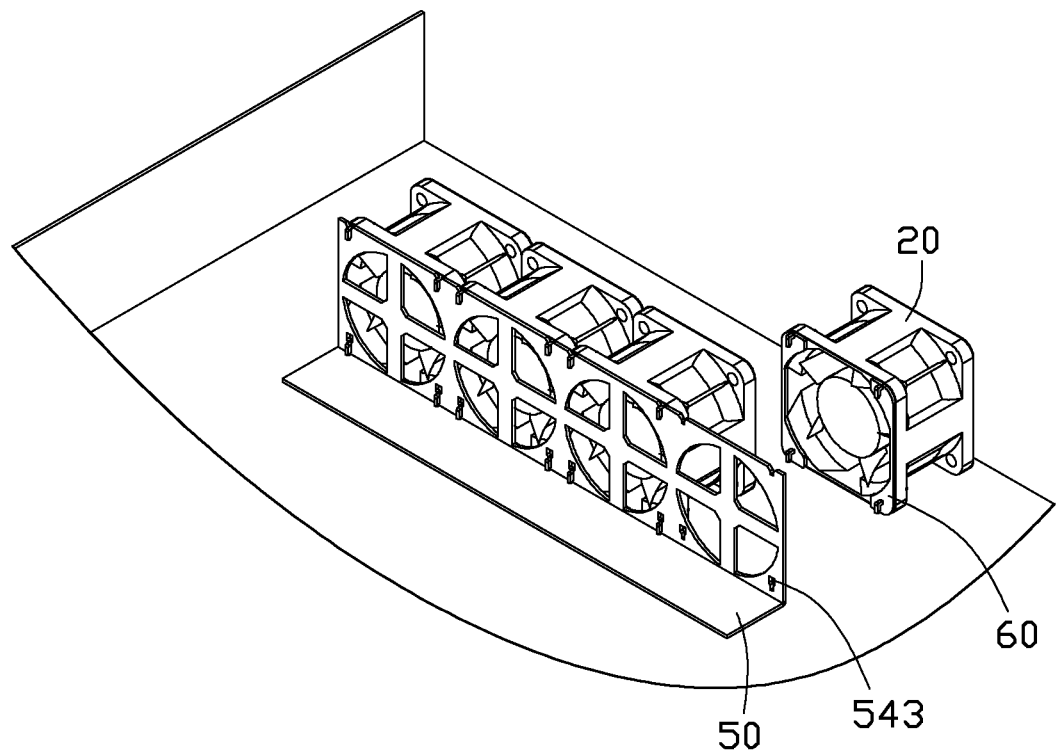
FIG. 4 is a partially assembled, isometric view of FIG. 1.
Figure 5:
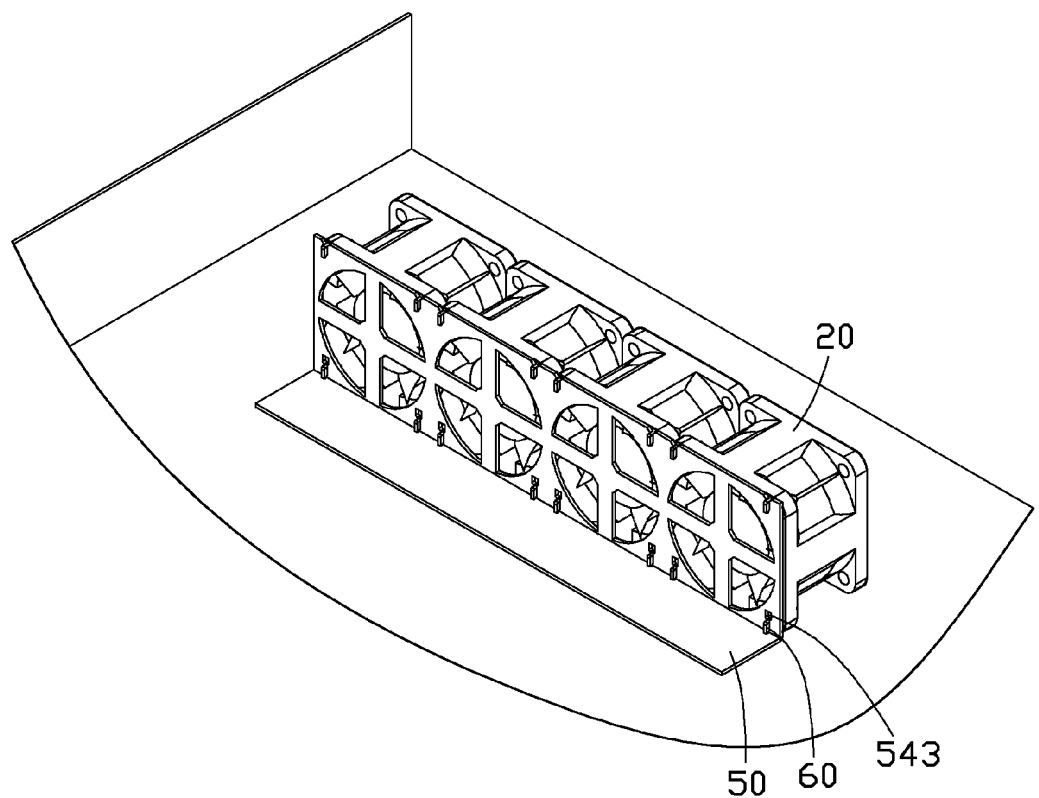
FIG. 5 is an assembled view of FIG. 1.

Referring to FIGS. 4-5, in assembly, the second hooks 66 of each fastening member 60 are inserted into the corresponding fixing holes 24 from an outer side of one of the sidewall 22. The guiding surface 668 of each second hook 66 slidably abuts against on an inner wall bounding the corresponding fixing hole 24, deforming the extending portion 662, until the stop portion 664 pass through the fixing hole 24. The extending portion 662 is self-restored and snappingly engages with an inner surface of the sidewall 22. The first hooks 64 of each fastening member 60 are inserted into the holding portion 543b of the corresponding slots 543 through the corresponding guiding portions 543a. The engaging blocks 642 engage into the corresponding holding portions 543b. The latching blocks 644 abut against an outer surface of the fixing plate 54 distant from the fan 20. The fan 20 is thus securely attached on the fixing plate 54, and is aligned with a corresponding vent area 541.

The combination of the fan 20 and the fastening members 60 is detached from the support 50 by disengaging the first hooks 64 from the corresponding slots 543. The combination of the fan 20 and the fastening members 60 then can be easily removed from the fixing plate 54.

While the disclosure describes examples and embodiments, it is to be understood that the disclosure is not limited thereto. To the contrary, the disclosure is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fixing device for fixing a fan thereon, the fan comprising a sidewall, and the sidewall defining a plurality of fixing holes, the fixing device comprising:

a support comprising a fixing plate, the fixing plate defining a vent area and a plurality of slots located around the vent area; and a pair of fastening members, each fastening member comprising a connecting plate, a plurality of first hooks extending out from a first side of the connecting plate, and a plurality of second hooks extending out from a second side of the connecting plate opposite to the first hooks, wherein each first hook is latched into a corresponding one of the slots of the fixing plate, each second hook is latched into a corresponding one of the fixing hole of the fan;

wherein each slot above the vent area comprises a first guiding portion extending through a top edge of the fixing plate, and a first holding portion extending down from a bottom end of the first guiding portion, each slot below the vent area comprises a second guiding portion communicating with the vent area and a second holding portion extending down from a bottom end of the second guiding portion, and each first hook is detachably inserted into the corresponding one of the first and second holding portions through the corresponding one of the first and second guiding portions.

2. The fixing device of claim 1, wherein each first hook comprises an engaging block perpendicularly extending out from the connecting plate, and a latching block perpendicularly extending down from a distal end of the engaging block, the engaging block engages in the corresponding holding portion, the latching block abuts against an outer surface of the fixing plate away from the fan.

3. The fixing device of claim 1, wherein each second hook comprises a resilient extending portion perpendicularly extending out from the connecting plate, and a stop portion extending out from a distal end of the extending portion, the stop portion extends through the corresponding fixing hole, to latch a surface of the sidewall of the fan opposite to the fixing plate.

4. The fixing device of claim 3, wherein a side surface of each stop portion opposite to the other stop portion forms a tapered guiding surface.

5. The fixing device of claim 1, wherein the support further comprises a mounting plate extending from the fixing plate for mounting the support to an electronic device.

6. A fixing device for fixing a plurality of fans thereon, each fan comprising a sidewall and the sidewall defining a plurality of fixing holes, the fixing device comprising:

a support comprising a fixing plate, the fixing plate defining a plurality of vent areas aligned along the lengthwise direction of the fixing plate and a plurality of slots located around each vent area; and a plurality of pairs of fastening members, each fastening member comprising a connecting plate, a plurality of first hooks extending out from a first side of the connecting plate, and a plurality of second hooks extending out from a second side of the connecting plate opposite to the first hooks, wherein each first hook is latched into a corresponding one of the slots of the fixing plate, each second hook is latched into a corresponding one of the fixing holes of one of the fans.

7. The fixing device of claim 6, wherein each slot above the vent areas comprises a first guiding portion extending through a top edge of the fixing plate, and a first holding portion extending down from a bottom end of the first guiding portion, each slot below the vent areas comprises a second guiding portion communicating with the vent area and a second holding portion extending down from a bottom end of the second guiding portion, and each first hook is detachably inserted into the corresponding one of the first and second holding portions through the corresponding one of the first and second guiding portions.

8. The fixing device of claim 7, wherein each first hook comprises an engaging block perpendicularly extending out from the connecting plate, and a latching block perpendicularly extending down from a distal end of the engaging block, the engaging block engages in the corresponding holding portion, the latching block abuts against an outer surface of the fixing plate away from the fan.

9. The fixing device of claim 6, wherein each second hook comprises a resilient extending portion perpendicularly extending out from the connecting plate, and a stop portion extending out from a distal end of the extending portion, the stop portion extends through the corresponding fixing hole, to latch a surface of the sidewall of the fan opposite to the fixing plate.

10. The fixing device of claim 6, wherein the support further comprises a mounting plate extending from the fixing plate for mounting the support to an electronic device.

\* \* \* \* \*